United States Patent [19]
Elenbaas

[11] 4,395,733
[45] Jul. 26, 1983

[54] TELEVISION SPECIAL EFFECTS CIRCUIT FOR WIPING VIDEO SIGNALS

[76] Inventor: William J. Elenbaas, 130 S. Pine St., McBain, Mich. 49657

[21] Appl. No.: 228,190

[22] Filed: Jan. 26, 1981

[51] Int. Cl.³ .............................................. H04N 5/21
[52] U.S. Cl. ...................................... 358/183; 358/22
[58] Field of Search ................. 358/22, 181, 182, 183, 358/28; 330/254, 124 R

[56] References Cited

U.S. PATENT DOCUMENTS

| | | | |
|---|---|---|---|
| 2,964,589 | 12/1960 | Walker | 358/183 X |
| 3,392,231 | 7/1968 | Schonfelder | 358/22 |
| 3,549,793 | 12/1970 | Ross | 358/22 X |
| 4,003,078 | 1/1977 | Owen | 358/22 |

Primary Examiner—Robert L. Richardson
Attorney, Agent, or Firm—Price, Heneveld, Huizenga & Cooper

[57] ABSTRACT

A method of wiping from one television video source to another encompasses the steps of mixing the color burst information during each horizontal blanking interval while wiping the video information carrying portion of each horizontal scan interval from one source to another. A special effects circuit for accomplishing this method includes a pair of variable gain linear amplifiers each having an input terminal coupled to a respective source of video signals to be wiped, and a circuit for providing a wipe control signal applied to the input of the amplifiers to control the gain of the amplifiers during the horizontal blanking interval in proportion to the percentage of wiping taking place, and control the variable gain amplifiers during the remaining portion of each horizontal scanning interval to apply either video from one or the other video sources. As signals from one video source are progressively wiped onto the raster, the proportionate mixing of the color burst signals progressively changes in direct proportion to the proportion of each video being displayed during the wiping process.

5 Claims, 4 Drawing Figures

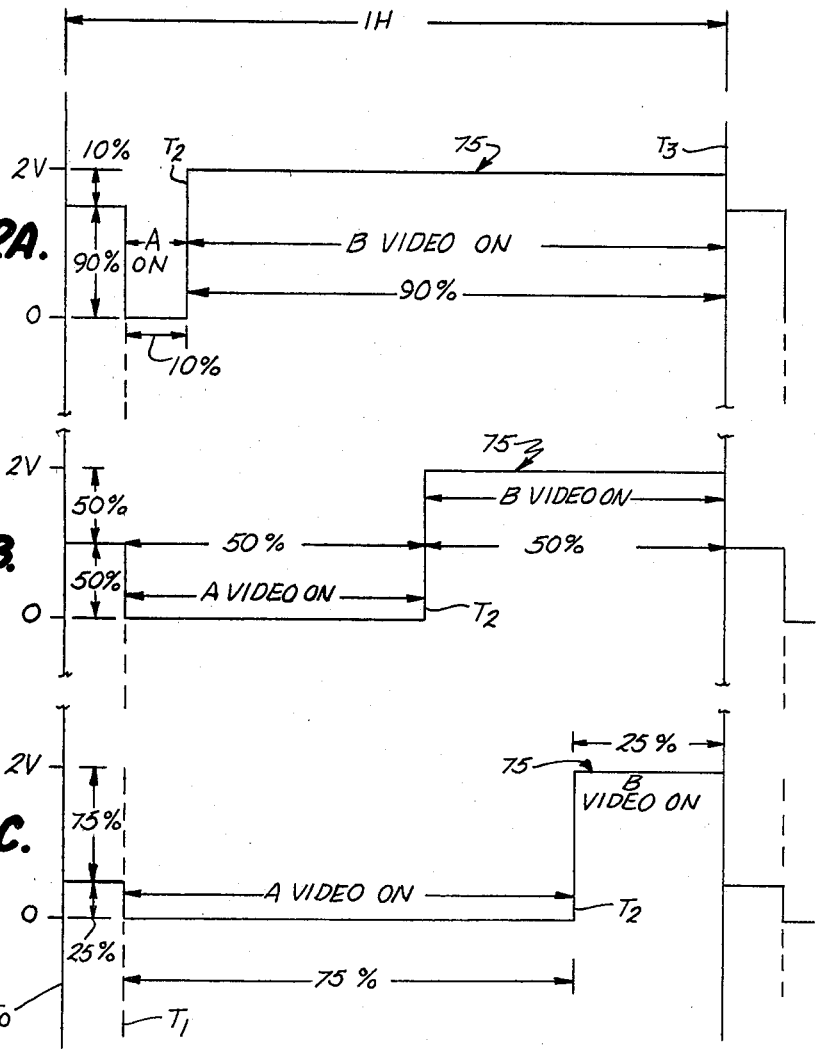

TELEVISION SPECIAL EFFECTS CIRCUIT FOR WIPING VIDEO SIGNALS

BACKGROUND OF THE DISCLOSURE

The present invention pertains to an electrical circuit and method for wiping from one television video source to another video source.

In television broadcasting, several special effects systems are employed on a regular basis. One of these is employed for the wiping from one source of video to another either by a horizontal wiping action from left to right of the reproduced television raster, a vertical wipe from top to bottom, or a diagonal wipe which is a combination of horizontal and vertical waveforms. The horizontal wipe is used to explain the invention. With color television broadcasting, when switching from one video source to another during wiping, frequently the phase of the color burst signal present during the horizontal blanking interval is different from one source to another. If the difference is greater than 5° maximum, a significant tint variation between the two video sources during a wipe is noticeable. Although this problem has been recognized in the prior art, as for example, illustrated by U.S. Pat. Nos. 2,964,589 and 4,180,829; the prior art does not suggest a system as provided herein for mixing the color burst information during the blanking interval of each scan interval while wiping from one video source to another during the video signal information portion of each scan interval.

SUMMARY OF THE PRESENT INVENTION

The system of the present invention encompasses a circuit for proportionately mixing the color burst information from a pair of video signal sources while wiping from one video source to another in the same proportion. The invention encompasses a method where the color burst signals are progressively mixed in the same proportion as the wiping of video information from one source to another. As a result, the maximum phase deviation between the two video signal sources is significantly reduced virtually eliminating any objectionable hue or tint variation between the signal sources as the scan wipes from one source to another.

Circuits embodying the present invention include a pair of variable gain linear amplifiers for receiving video from a pair of sources and for receiving a wiping control signal which includes a color burst mixing portion and a video signal wiping control portion for proportionately mixing the color burst information from the pair of sources while wiping from one video source to another in the same proportion.

These and other features, objects and advantages of the present invention can best be understood by reference to the following description thereof together with the accompanying drawings in which:

BRIEF DESCRIPTION OF THE DRAWINGS

FIG. 2A is a waveform diagram showing a wiping control signal present in the circuit of FIG. 1 during a first stage of video wiping;

FIG. 2B is a waveform diagram showing the wiping control signal during a later stage of wiping; and FIG. 2C is a waveform diagram showing the wiping control signal at still a later stage of video wiping.

DETAILED DESCRIPTION OF THE PREFERRED EMBODIMENT

Figure 1:
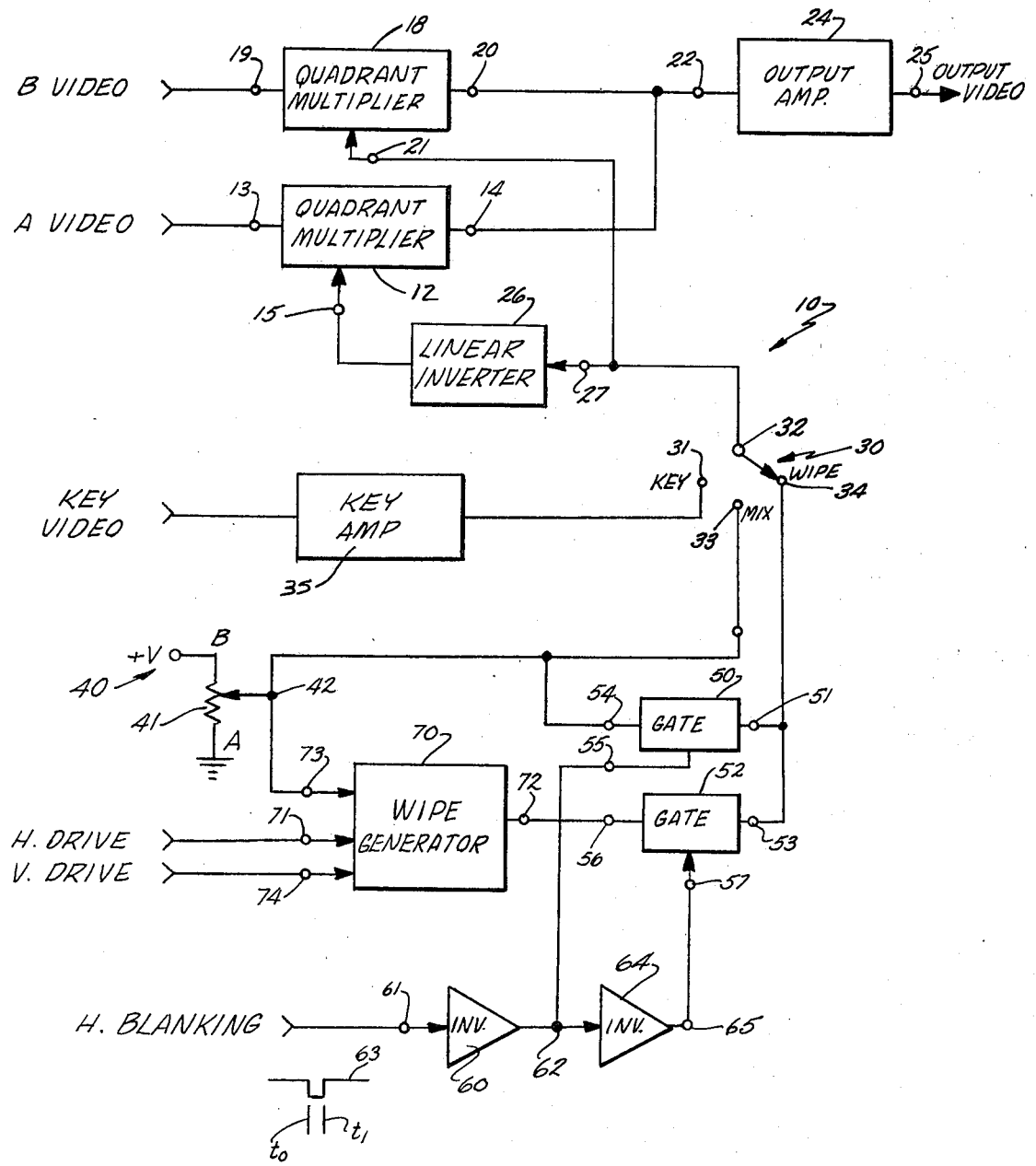
FIG. 1 is an electrical circuit diagram in block and schematic form showing a circuit embodying the present invention.

Referring initially to FIG. 1 there is shown a special effects circuit 10 embodying the present invention and employed for practicing the method of the invention. Circuit 10 includes a first variable gain linear amplifier 12 which is also known as a quadrant multiplier which has an input terminal 13 for receiving composite video signals from a source A of video information which may, for example, be a video tape recorder, a color camera, or the like. Amplifier 12 further includes an output terminal 14 and a control input terminal 15. Circuit 10 further includes a second variable gain linear amplifier 18 identical to amplifier 12 and having an input terminal 19 coupled to a second source B of television video information which can be a second camera associated with the scene being televised, a second video tape recorder or other video information source. Amplifier 18 also includes an output terminal 20 and a control input terminal 21. Amplifiers 12 and 18 in the preferred embodiment are commercially available integrated circuit chips identified as quadrant multipliers model No. CA3091D. The output terminals 14 and 20 of the amplifiers are commonly coupled to input terminal 22 of a conventional video output or distribution amplifier 24 having an output terminal 25. Amplifier 24 mixes the input signals and provides video output signals including the special effects available through circuit 10.

Coupled to the control input terminal 15 of amplifier 12 is a linear inverter 26 having an input terminal 27 coupled to the common terminal 32 of a three position switch 30. Inverter 26 is an operational amplifier with a +2 V DC offset bias network coupled to its noninverting input. Its inverting input is coupled to terminal 27 so +2 volt applied at input terminal 27 will result in a OV signal at the output. Terminal 32 of switch 30 is also coupled to the control input terminal 21 of amplifier 18. Switch 30 is movable between three different special effect modes including a key mode indicated by switch contact 31, a mixing mode indicated by switch contact 33, and the wipe mode at switch contact 34 as shown in the system of the preferred embodiment. In the key mode, keyed video is received from a source of keyed video information from a key amplifier 35 and applied to the amplifier 12 and 18 by through switch 31, if switch is in the key position 31. Similarly, when it is desired to mix the source information from video A and video B, switch 30 is moved to position 33 in which a DC control voltage from the variable voltage source 40 is applied to the input terminals of amplifiers 12 and 18 to provide superposition of the two video signals in a proportion depending on the voltage provided by variable voltage source 40.

Coupled to terminal 34 of switch 30 is the commonly coupled output terminals 51 and 53 of controlled gate circuits 50 and 52 respectively. Gate circuit 50 includes an input terminal 54 coupled to the output terminal 42 of variable voltage source 40 and a control input terminal 55 coupled to the output terminal 62 of an inverter circuit 60 having an input 61 coupled to a source of horizontal blanking signals 63 in the preferred embodiment of the invention. Gate 52 has an input terminal 56 coupled to the output terminal 72 of a wipe generator circuit 70 and a control input terminal 57 coupled to the output terminal 65 of a second inverter circuit 64 having its input terminal coupled to output terminal 62 of inverter 60. The negative going horizontal blanking signal 63 when applied successively to gate 60 and 64 enable gate 50 during the horizontal blanking interval from $t_0$–$t_1$ and disable gate 52 during the horizontal blanking interval with the gates being in the opposite state during the remaining portion of each scanning interval as described in greater detail below.

Wipe generator 70 is of conventional construction to provide in response to a variable voltage provided at output terminal 42 of variable voltage source 40, a square wave output having a variable duty cycle corresponding to the wiping of information from left to right during a horizontal wiping sequence of operation. Generator 70 thus comprises a sawtooth generator whose frequency is synchronized by horizontal drive signals applied at an input 71 terminal of circuit 70, the DC level on the sawtooth waveform is controlled by the DC signals applied at input terminal 73 from voltage source 40. Vertical drive signals are also applied to wipe generator at input terminal 74. The output of the sawtooth generator with the DC level on it is conventionally included within wipe generator 70 is coupled to a Schmitt trigger to provide the variable duty square wave output signal in response to the variable DC voltage applied at input terminal 73.

The variable voltage source 40 in the preferred embodiment of the invention comprises a source +v of regulated DC voltage which in the preferred embodiment is +2 volts applied to one terminal of a potentiometer 41 having its remaining terminal grounded. The wiper arm of potentiometer 41 is coupled to output terminal 42 such that as the potentiometer is varied, the output voltage from source 40 will vary between +2 and 0 volts corresponding to video B information and video A information respectively as indicated. The operation of the circuit shown in FIG. 1 can best be understood by reference to FIGS. 2A–2C which are now described.

The waveform shown in FIGS. 2A–2C represents the wipe control voltage at terminal 32 of switch 30 which is applied to the input of linear inverter 26 and simultaneously to the input 21 of amplifier 18. Shown is a horizontal scanning interval of a standard NTSC color television signal. Time $t_0$ and $t_1$ shown in FIGS. 2A–2C corresponds to the horizontal retrace interval in which the A and B video signals applied to the inputs of amplifiers 12 and 18 include horizontal sync pulses, the 3.58 MHz color burst signal which is the subject of the present invention and the DC blanking level information. The time period $t_1$ to $t_3$ corresponds to the video signal information carrying portion of each horizontal trace across the television raster. Thus, the wipe control waveform shown in FIGS. 2A through 2C include a horizontal blanking interval from time $t_0$ to time $t_1$ and the video signal information carrying interval from time $t_1$ to time $t_3$ at which time the cycle is repeated in a normal raster scan in which odd and even fields are alternately scanned and between which vertical retrace takes place.

Before discussing the specific control signals shown in the FIGS. 2A through 2C, it is noted that amplifiers 12 and 18 have a linear gain between 0 and 1. With a 0 volt on its control input this gain is 0, with a +1 volt on its control input their gain is ½ and with a +2 volt on its control input their gain is 1. The amplitude or voltage level of the signals 75 shown in FIGS. 2A through 2C during horizontal blanking is directly controlled by the variable voltage source 40 depending upon the position of the wiper arm of potentiometer 41. During time $t_1$ through $t_3$, however, the control signal is either at a 0 voltage level or at a +2 voltage level to either apply all of the video from source A or all of the video from source B to the output amplifier 24. The 0 to +2 volt level is established by the wipe generator 70 to provide binary control of amplifiers 12 and 18 during the horizontal video information portion of each horizontal interval $t_1$ to $t_3$. The horizontal blanking interval $t_0$ to $t_1$ of course is established by the horizontal blanking pulses 63 (FIG. 1) applied to terminal 61 of inverter 60. The total horizontal interval $t_0$ to $t_3$ is established by horizontal drive signals applied to the wipe generator 70 at input terminal 71 by standard commercially available horizontal and vertical signal generators.

In FIG. 2A which shows wiping proceeding, beginning with the switching from continuous video B to the beginning of adding or wiping video A onto video B, there is shown a 10% wiping. Thus, time $t_2$ which represents the switching from video A to video B occurs 10% of the total time interval from $t_1$ to $t_3$. Visually, at this point the viewer would see 10% of the left side of the television screen carrying video A, while 90% to the right of the video A vertical band would be video B. The polarities of the system are such that as shown in FIG. 1 with wiper arm of the potentiometer 41 of variable voltage source 40 at the top, all of video B is displayed while as the potentiometer moves down video A replaces video B until the zero voltage level is reached when video A is fully on. For the waveform shown in FIG. 2A, the potentiometer arm would be in a position providing 1.8 volts. Beginning at time $t_0$, the negative going horizontal blanking pulse applied to inverter 61 becomes a positive going signal at output terminal 62 which is applied to the input of gate 50 thereby enabling gate 50 to apply the 1.8 volt signal from source 40 through switch 30 to amplifier 18 and to amplifier 12 inverted by inverter 26. At the same time, the horizontal blanking pulse 63 is applied to disable gate 52 by virtue of the second inversion through inverter 64. Thus, during the horizontal blanking interval, gate 50 applies the DC level selected by variable reference source 40 to amplifiers 12 and 18. With amplifier 18 receiving a 1.8 volt control signal, its gain is approximately 0.9. Inverter 26, on the other hand, inverts the +1.8 V signal to which is added the +2 V DC offset to provide a +0.2 volt control signal to amplifier 12 which accordingly provides a gain of 0.1. Thus, during horizontal blanking in which the color burst signals are present, 90% of the color burst signal from video source B is applied to the input of amplifier 24 and 10% of the color burst information of the video signal A is applied to amplifier 24. Any phase difference accordingly is proportionately mixed at a 1 to 9 ratio (video A to video B) by the output amplifier 24 such that the major portion, i.e., 90% of the color burst information for the entire raster is controlled by video B which occupies 90% of the viewed screen.

Similarly, during the video signal information carrying portion of each horizontal interval corresponding to the time period of $t_1$ to $t_3$, 10% of the total horizontal scan of A video is applied to output amplifier as represented by the zero level signals from $t_1$ to $t_2$ which, when inverted by circuit 26 provides unity gain for the A video amplifier 12 and zero gain to amplifier 18. From time $t_2$ to time $t_3$, however, inverter 26 responds to the +2 V input signal 75 and provides 0 volts to amplifier 12 cutting off video A and at the same time providing a 2 volt level to amplifier 18 applying video B to amplifier 24 during the period of $t_2$ to $t_3$. The video information is therefore time division multiplexed in exactly the same proportion as the level of control signals 75 and thus the relative color burst signals during the horizontal blanking interval. Time $t_2$ occurs during the $t_1$–$t_3$ interval depending on the position of the wiper arm on potentiometer 41 and thus the wiping control voltage which is applied to the wipe generator to control the DC on the sawtooth signal generated within the wipe generator and used to trigger a Schmitt trigger circuit.

As wiping progresses to the midway point as represented by FIG. 2B, the signal from source 40 is at +1 V providing 50% gain from both amplifiers 12 and 18 such that the color burst signals are equally amplified and mixed by output amplifier 24. If for example the color burst phases are 6° out of phase with each other thereby providing an otherwise objectionable tint variation in a conventional circuit, the color burst on both the left and right side would be identical and 3° out of phase from the video A source and 3° out of phase from the video B source in the system of this invention but the overall effect is the same tint change on both sides of the reproduced television picture. Time $t_2$ occurs in the FIG. 2B signal precisely midway between times $t_1$ and $t_3$. As wiping progresses to the ¾ position where the wiper arm of potentiometer 41 is positioned such that reference voltage source provides a 0.5 volt signal output, the gain of amplifier 12 on the color burst is then at ¾, while the gain of amplifier 18 on the color burst is at ¼ thereby blending the color burst in a 3 to 1 ratio. Inasmuch as ¾ of the picture screen is occupied by video A, ¾ of the color burst information is employed to control the tint dominated now by the video A information. At this time $t_2$ occurs ¾ of the distance from time $t_1$ to time $t_3$ such that the viewer sees ¾ of the raster being occupied by video A and ¼ on the right side of the raster being occupied by video B.

In each case shown in FIGS. 2A through 2C which represent three points of the wiping interval, the percentage of video displayed on the raster is directly proportional to and the same as the percentage mixing of the color burst information from the respective video sources. This method of wiping thereby provides the mixing of color burst information during the horizontal blanking interval from a pair of video sources while wiping the video information itself during the video information carrying portion of each horizontal interval. By doing so, no objectionable tint variations are visually detectable by the viewer in the event the color burst signals from the two separate video sources are out of phase.

Various modifications to the preferred embodiment of the invention of course can be made by, for example, replacing the manual video wipe control pot 41 with an adjustable ramp voltage generator for 0-2 V operation which can be triggered to provide a wiping voltage with selected speeds for accomplishing wiping automatically.

These and other modifications to the preferred embodiment of the invention as described herein, however, will fall within the spirit and scope of the invention as defined by the appended claims.

The embodiments of the invention in which an exclusive property or privilege is claimed are defined as follows:

1. A special effects circuit for wiping from one composite video source to another composite video source comprising:
   only two variable gain linear amplifiers each having an input terminal for receiving composite video signals including color burst signals to be wiped, said amplifiers further including control input terminals and output terminals;
   circuit means for providing a wipe control signal applied to the control input terminals of said variable gain amplifiers to control the gain of the amplifiers during each blanking interval in proportion to the wiping action for mixing the color burst signals from the two sources and to control the variable gain amplifiers during the remaining portion of each scanning interval in the same proportion to provide video signals to said output terminals from one or the other video sources; and
   an output amplifier having an input terminal coupled to said output terminals of said variable gain amplifiers for mixing the signals from said variable gain amplifiers and including an output terminal for providing video output signals thereat.

2. The circuit as defined in claim 1 wherein said circuit means includes a variable direct voltage source and first gate circuit means coupled to said voltage source and including a control terminal for coupling to a source of blanking signals for providing said control signal at the output of said first gate circuit means during each blanking interval.

3. A special effects circuit for wiping from one composite video source to another composite video source comprising:
   a first variable gain linear amplifier having an input terminal for receiving video signals from a first source of composite video signals, an output terminal, and a control terminal;
   a linear inverter circuit coupled to said control input terminal of said first amplifier;
   a second variable gain linear amplifier having an input terminal for receiving video signals from a second source of composite video signals, an output terminal coupled to said output terminal of said first amplifier, and a control terminal;
   circuit means for providing a wipe control signal applied to said control input of said second amplifier and to said inverter, said control signal having a blanking interval and a video signal interval and wherein said level of color burst voltage signals during said blanking interval is directly proportional to the proportion of video being wiped whereby the color burst signals at the output of said amplifiers during said blanking interval are proportionately mixed while the video information signals are wiped from one source to another in the same proportion.

4. A special effects circuit for wiping from one composite video source to another composite video source comprising:
   a first variable gain linear amplifier for receiving composite video signals from one source, said amplifier having an input terminal, an output terminal, and a control terminal;
   a second variable gain linear amplifier for receiving composite video signals from another source, said second amplifier having an input terminal, an output terminal, and a control terminal;

a variable voltage source for providing a wiping control voltage;

an inverter coupled to said control terminal of one of said first or second amplifiers;

first and second gate circuit means having input terminals and commonly coupled output terminals, said output terminals coupled to said inverter and to the control terminal of the other of said first or second amplifiers;

means for applying blanking signals of opposite polarity to said gate circuits to enable one of said gates during a blanking interval and disable the other of said gate circuits during a blanking interval;

means coupling said variable voltage source to the input of the gate enabled during a blanking interval; and wipe generator means coupled to said variable voltage source and including means for receiving horizontal and vertical drive signals for providing at an output terminal thereof, a wiping control signal, said output terminal of said wipe generator means coupled to said other gate circuit whereby a composite wiping control signal is provided to the commonly coupled output terminals of said gate circuits and applied to said first and second amplifiers to mix the color burst signals of the two video sources during each blanking inteval and to wipe from one video signal source to the other as the voltage from said variable source is varied in the same proportion.

5. The circuit as defined in claim 4 wherein said variable voltage source comprises a regulated voltage supply and a potentiometer coupled thereto to provide a selectable voltage output to control the wiping.

* * * * *

UNITED STATES PATENT AND TRADEMARK OFFICE
CERTIFICATE OF CORRECTION

PATENT NO. : 4,395,733
DATED : July 26, 1983
INVENTOR(S) : William J. Elenbaas

It is certified that error appears in the above—identified patent and that said Letters Patent is hereby corrected as shown below:

Column 3, line 45:

"$t_0$ and $t_1$" should be --$t_0$ to $t_1$--

Column 4, line 53:

"of" should be --on--

Column 8, Claim 4, line 9:

"inteval" should be --interval--

Signed and Sealed this

Seventeenth Day of January 1984

[SEAL]

Attest:

GERALD J. MOSSINGHOFF

Attesting Officer

Commissioner of Patents and Trademarks